US011639312B2

(12) United States Patent
Schnetter et al.

(10) Patent No.: US 11,639,312 B2
(45) Date of Patent: May 2, 2023

(54) TRANSPARENT CERAMIC AS A COMPONENT FOR FRACTURE-RESISTANT OPTICAL UNITS

(71) Applicant: CeramTec-ETEC GmbH, Plochingen (DE)

(72) Inventors: Lars Schnetter, Wimbach (DE); Tino Schreiner, Puderbach (DE); Jürgen Waidhas, Mitterteich (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 643 days.

(21) Appl. No.: 15/736,247

(22) PCT Filed: Jun. 16, 2016

(86) PCT No.: PCT/EP2016/063946
§ 371 (c)(1),
(2) Date: Dec. 13, 2017

(87) PCT Pub. No.: WO2016/202951
PCT Pub. Date: Dec. 22, 2016

(65) Prior Publication Data
US 2018/0155247 A1 Jun. 7, 2018

(30) Foreign Application Priority Data

Jun. 16, 2015 (DE) .......................... 102015211040.0

(51) Int. Cl.
| | |
|---|---|
| C04B 35/10 | (2006.01) |
| B32B 18/00 | (2006.01) |
| B32B 9/00 | (2006.01) |
| B32B 17/06 | (2006.01) |
| C04B 37/04 | (2006.01) |
| C04B 35/115 | (2006.01) |
| C04B 37/00 | (2006.01) |
| C04B 35/622 | (2006.01) |
| C04B 35/626 | (2006.01) |
| C04B 35/628 | (2006.01) |
| C04B 35/645 | (2006.01) |

(52) U.S. Cl.
CPC .............. *C04B 35/10* (2013.01); *B32B 9/005* (2013.01); *B32B 17/06* (2013.01); *B32B 18/00* (2013.01); *C04B 35/115* (2013.01); *C04B 35/62218* (2013.01); *C04B 35/62645* (2013.01); *C04B 35/62802* (2013.01); *C04B 37/00* (2013.01); *C04B 37/047* (2013.01); B32B 2307/412 (2013.01); B32B 2309/105 (2013.01); C04B 35/6268 (2013.01); C04B 35/62625 (2013.01); C04B 35/62695 (2013.01); C04B 35/645 (2013.01); C04B 2235/3206 (2013.01); C04B 2235/3217 (2013.01); C04B 2235/3225 (2013.01); C04B 2235/3227 (2013.01); C04B 2235/5445 (2013.01); C04B 2235/5454 (2013.01); C04B 2235/604 (2013.01); C04B 2235/605 (2013.01); C04B 2235/6023 (2013.01); C04B 2235/666 (2013.01); C04B 2235/72 (2013.01); C04B 2235/766 (2013.01); C04B 2235/77 (2013.01); C04B 2235/785 (2013.01); C04B 2235/787 (2013.01); C04B 2235/95 (2013.01); C04B 2235/9653 (2013.01); C04B 2237/343 (2013.01); C04B 2237/704 (2013.01)

(58) Field of Classification Search
CPC ..... C04B 35/10; C04B 35/115; C04B 35/645; C04B 2237/343; C04B 2237/704; C04B 2235/3217; C04B 2235/785; B32B 9/005; B32B 2307/412
See application file for complete search history.

(56) References Cited

U.S. PATENT DOCUMENTS

| | | | | |
|---|---|---|---|---|
| 5,625,256 | A * | 4/1997 | Tiedt ..................... | C04B 35/115 313/493 |
| 5,682,082 | A | 10/1997 | Wei et al. | |
| 7,396,792 | B2 | 7/2008 | Van Bruggen | |
| 2005/0168124 | A1* | 8/2005 | Justel .................... | H01J 65/046 313/486 |
| 2006/0169951 | A1* | 8/2006 | Van Bruggen ...... | C04B 35/6455 252/500 |
| 2007/0068375 | A1* | 3/2007 | Jones .................... | F41H 5/0414 89/36.02 |
| 2007/0152597 | A1* | 7/2007 | Van Bruggen .......... | H01J 9/247 313/635 |
| 2009/0137380 | A1 | 5/2009 | Bernard-Granger et al. | |
| 2014/0192467 | A1 | 7/2014 | Kwong | |

FOREIGN PATENT DOCUMENTS

| | | |
|---|---|---|
| CN | 1668550 A | 9/2005 |
| CN | 101194141 A | 6/2008 |
| CN | 101468915 A | 7/2009 |

(Continued)

OTHER PUBLICATIONS

International Search Report for PCT/EP2016/063946 dated Oct. 7, 2016; English translation submitted herewith (7 pages).
Office action in CN Appln. No. 201680047631.6 dated Jul. 3, 2020.
Rasmussen et al., "Effect of Dopants on the Defect Structure of Single-Crystal Aluminum Oxide", Journal of The American Ceramic Society, Blackwell Publishing, Malden, MA, US, vol. 53, No. 8, Nov. 1, 1968 (pp. 436-440).
Office action of Russian Appln. No. 2018101291/03(001654) dated Dec. 23, 2019.
Krell A. et al., "Physics and Technology of Transparent Ceramic Armor: Sintered A12O3 vs Cubic Material," Nanomaterials and Technology for Military Vehicle Structural Applications, 2005.

*Primary Examiner* — Laura A Auer
(74) *Attorney, Agent, or Firm* — Fitch, Even, Tabin & Flannery, LLP

(57) ABSTRACT

The present invention relates to parts of transparent corundum ceramics and the production and use of said parts.

19 Claims, No Drawings

(56) References Cited

FOREIGN PATENT DOCUMENTS

| | | |
|---|---|---|
| DE | 10 2006 049 081 A1 | 4/2008 |
| EP | 0131267 A1 | 1/1985 |
| EP | 0657399 A1 | 6/1995 |
| GB | 2071073 A | 9/1981 |
| RU | 2083531 C1 | 7/1997 |
| RU | 2402506 C1 | 10/2010 |
| SU | 460274 A1 | 2/1975 |
| WO | 2004/007397 A1 | 1/2004 |
| WO | 2004/007398 A1 | 1/2004 |
| WO | 2005/068392 A1 | 7/2005 |
| WO | 2011/012125 A1 | 2/2011 |

\* cited by examiner

TRANSPARENT CERAMIC AS A COMPONENT FOR FRACTURE-RESISTANT OPTICAL UNITS

CROSS-REFERENCE TO RELATED APPLICATIONS

This application is a U.S. national phase application filed under 35 U.S.C. § 371 of International Application No. PCT/EP2016/063946, filed Jun. 16, 2016, designating the United States, which claims priority from German Patent Application No. 102015211040.0, filed Jun. 16, 2015, which are hereby incorporated herein by reference in their entirety.

The present invention relates to parts of transparent corundum ceramics and to the production and use of said parts.

Transparent ceramics can be used in a variety of applications. High service temperatures and high hardnesses result in advantages over glass materials. For example, transparent ceramics are presently used in optics (e.g., as a protective enclosure of laser systems, as a wear-resistant pane in optics) and as a protective pane for military vehicles that consists of a system of transparent materials. Monocrystalline (sapphire) and polycrystalline (corundum) aluminum oxide is a ceramic having extreme hardness. The combination of excellent resistance to hard materials (e.g., minerals), high compressive strength, excellent flexural strength, and moderate fracture toughness make aluminum oxide an ideal material solution for fracture-resistant optical units.

The transparency of ceramics is primarily determined by the index of refraction of the material and the flawlessness of the parts. The index of refraction n of the material determines, by means of surface reflections, the theoretical transmittance $T_0$, which is reduced by light absorption and light scattering in real components. The theoretical transmittance is 85-87% for ceramics. A theoretical transmittance of $T_0=85.7\%$ (with $n_{\lambda=600\ nm}=1.76$) results for corundum. To achieve the theoretical transmittance, an ideally produced, i.e., pore-free, microstructure (porosity <100 ppm) and a phase-pure composition (purity >99.9%, better 99.99%) are required.

The mechanical properties of polycrystalline submicron corundum ($\alpha$-$Al_2O_3$) having crystal sizes of <500 nm are superior to those of all transparent cubic ceramics, such as magnesium aluminum spinel, aluminum oxynitride, and yttrium aluminum garnet. Hardnesses of up to 2,200 HV 10, flexural strengths of 700-1,000 MPa, a modulus of elasticity of >400 GPa, and fracture toughnesses of up to 4 MPa$\sqrt{m}$ can be achieved. The use as a transparent material is presently limited by the optically anisotropic crystal system and resulting birefringence of the light waves, because sufficient transmittances of >65% cannot be achieved.

A high transparency of >65% of corundum parts can be achieved only if the crystal size remains below the wavelength of the light waves (380-480 nm). Such materials can be technically realized by means of very fine starting powder having primary particle sizes of <150 nm, better <80 nm, and ideally <50 nm. Doping with a foreign material at up to 1500 ppm (preferably magnesium oxide at up to 500 ppm) is known as a means of inhibiting grain growth. Furthermore, alignment of the grains can lead to increased transparency.

The transparency of ceramics is typically specified by means of the real in-line transmittance (RIT). Light (in general, monochromatic light) passes through a sample, and a detector senses only scattered light having a low aperture angle of at most 0.5°. This measured quantity is presently a standard value for making reliable statements about the transparency of optical components.

Opacities of transparent components are registered by the human eye and are reflected by the RIT only to a limited extent. Opaque regions reduce the quality of high-quality display components (e.g., smartphones, tablets, watch crystals, scratch-resistant sensor panes). A measure of white opacity is the haze, which takes scattered light into account in a very sensitive manner. Low haze is essential in display components and optical applications. The "haze" parameter has hitherto not been considered in the case of transparent ceramics.

Light waves are diffracted into different directions at phase transitions as a result of deviating indices of refraction, and this leads to a loss of transparency because of deflection of the light waves. For high transparency, foreign phases must be avoided or the foreign phase content must be set as low as possible. In the non-cubic and optically anisotropic corundum crystals, the light waves are additional diffracted at the grain boundaries, because the index of refraction depends on direction ($\Delta n=0.008$). The loss of transparency can be avoided if the crystal size is less than the wavelength of the light; for example, grains having a diameter of less than 380 nm are required for high transparency in the visual light spectrum (380-780 nm). In particular, pure grain boundaries without foreign elements are necessary.

Despite known doping strategies, the production of transparent corundum ceramics with high transmittance (RIT>65%) without dopants has hitherto not been achieved, because grain growth occurs at high consolidation temperatures. U.S. Pat. No. 7,396,792 B2 describes a transparent polycrystalline corundum that can be produced with transparency values of RIT≥30%, in which grain growth is limited by doping with MgO (≤0.3 wt %) and $ZrO_2$ (0.1-0.5 wt %). The thickness of the corundum component is 0.8 mm. Other doping agents are metal fluorine compounds, which are added to a highly pure corundum powder (contaminants <100 ppm) at up to 2,000 ppm (DE 102009035501 A1). High-density and finely crystalline corundum ceramics (average microstructure grain size d50<500 nm) can thereby be produced. Transparent parts are not described in this document.

The problem addressed by the present invention was therefore that of producing and manufacturing parts of corundum ceramics and of providing a method for producing the parts.

It was possible to solve this problem by means of the part of transparent corundum ceramic according to claim 1. Preferred embodiments are specified in the dependent claims. The present invention also relates to a laminate comprising the part according to the invention and a method for producing the part.

Corundum ceramics have a high transmittance if the starting corundum powder is highly pure (>99.9%) and only slightly doped (<2000 ppm, better <1000 ppm).

However, the doping strategy is a decisive manipulated variable for small crystal sizes that is important for high transparency and low haze. Multiple doping, i.e., a combination of the dopants magnesium oxide, yttrium oxide, and lanthanum oxide or further oxides, preferably a combination of two, three, four, or five dopants (oxides), or single doping with one of the mentioned oxides is possible. By means of multiple doping, the grain size can be reduced by more than 40%, preferably even by more than 65%, in comparison with an undoped ceramic.

It is advantageous for the parts of transparent corundum ceramic if said parts have a haze of <10%, preferably <6%, and especially preferably <3%. Considering a pore-free ceramic, the grain size should be below 750 nm, preferably below 500 nm, especially preferably below 250 nm, to produce a corresponding haze.

Different methods designed for a low grain size in the completely consolidated part (porosity<100 ppm or 0.01%) can be used to produce the part of transparent corundum ceramic.

The corundum powder or the powder mixture can, for example, be mixed with a suitable organic material and granulated. Shaping is performed thereafter preferably by means of single- or two-stage dry pressing, consisting of uniaxial pressing or a combined method of uniaxial pressing and subsequent cold isostatic pressing. If the method is supported by cyclic pressing with a large number of pressing operations (up to 250 cycles), ceramics having a high green density and high degree of homogeneity can be produced.

In another method, a fine corundum powder can be consolidated by means of a quick sintering method (e.g., field-assisted sintering). High heating rates and short process times suppress transparency-reducing grain growth.

In a further method, the optically anisotropic corundum grains are aligned by means of process technology. A textured ceramic having increased transparency in comparison with a ceramic having statistically distributed grains results. This texturing can be achieved, for example, by applying strong magnetic fields of >5 teslas, better >8 teslas. Stable, i.e., low-sedimentation and low-agglomeration, ceramic suspensions of corundum powder having primary particles of <150 nm, better <50 nm, are required for this purpose. A combination with the gel casting method produces an especially positive effect. This variant is therefore especially suitable for producing a transparent ceramic having an RIT of >65% and a haze of <10% (US20110039685 A1).

The properties of the parts produced according to the mentioned methods can be improved if the corundum powders that are used have single or multiple doping, whereby, for example, a haze of <6% can be achieved. This applies in particular to thin parts having a thickness of <800 μm, preferably <500 μm, especially preferably <250 μm. A doping agent content of 2000 ppm (total amount of the dopants) has proven especially advantageous.

The consolidation with the required degree of consolidation of at least 99.99% can additionally be achieved by means of an additional pre-sintering step in a defined atmosphere (e.g., air, oxygen, inert gas) and at a defined temperature. In particular, especially advantageous parts can be produced by means of a method that comprises a combination of pre-sintering and multiple doping.

In addition, the carbon content in the consolidated part can be set low if high transparency and low haze should be achieved. The carbon content in the consolidated part can be set by means of process technology by a HIP method in industrial air. The tolerable C content can be set to <0.2%, preferably <0.05%.

Because of the high material hardness and material brittleness, the production of thin corundum components with thicknesses of <1 mm could hitherto not be achieved. Such parts are referred to as wafers in the context of this invention, which can be round, square, and rectangular. The preferred process for manufacturing wafers is wire sawing with specially diamond-equipped wire and optimized process fluids. A further embodiment of the wafer manufacturing is the punctiform input of energy by means of lasers, which energy leads to material damage and material disruption in the thickness direction (z direction). The wafers are detached mechanically, wherein the method can be implemented with or without additional temperature influence.

After the wafers have been manufactured, grinding and polishing methods are necessary to achieve the final surface quality and the optical properties. Suitable methods, which are distinguished in particular by the selection of an optimal cooling lubricant and by a sequence of grinding and polishing operations with defined grain size, should be used.

Surprisingly, it is possible to produce components with an RIT of >65%. This enables applications in numerous market areas, such as displays (e.g., dive computers, mobile telephones, tables, notepads, watches), watch crystals, scratch-resistant sensors, ground lights, machine windows, and camera lenses, for the first time. This can be achieved by manufacturing to a part thickness of <800 μm, preferably <500 μm, especially preferably <250 μm. The average grain sizes D50 of the corundum ceramic are <750 nm, preferably <500 nm, especially preferably <350 nm. These are typically microstructure grain sizes. They are determined by means of linear intercept methods.

Ceramic is superior to plastics and glasses, having considerably higher compressive strengths and hardnesses, and is therefore considerably more wear-resistant to hard particles such as grains of sand, natural rocks (granite, etc.), and glass fragments. Because of the brittle material behavior, a monolithic form of the ceramic is not always desirable.

A composite design of a substrate material (e.g., plastic, glass) and a hard ceramic layer combines the two materials in an ideal manner. The composite part is referred to as a laminate. The combining is accomplished by application of pressure and temperature, adhesive bonding by means of an organic or inorganic adhesive, and joining without an intermediate layer in such a way that high adhesion forces are formed.

According to the invention, a laminate comprises a layer of the part of transparent corundum ceramic according to the invention and at least one further layer of a substrate material. However, several layers of a substrate material can also be present in addition to the part of transparent corundum ceramic, wherein the substrate materials of the various layers can be the same or different from each other.

Surprisingly, it has been found here that, with thickness of the part of transparent corundum ceramic of <500 μm, preferably <300 μm, especially preferably <200 μm, in combination with a substrate material, preferably chemically hardened glass, as a laminate, extremely good results in the drop test onto a hard surface result.

Commercially available glasses have lower fracture toughnesses (<100 MPa) and flexural strengths (<1 MPa√m) and are not especially well suited for display applications. Glasses of new types can be placed under compression in regions near the surface (>50 μm) by ion exchange of lithium aluminosilicate glasses. The induced compressive stresses are at least 600 MPa (DE 102010009584 A1). The resistance to tensile stresses is thereby increased. Disadvantages of these glasses are the reduced scratch resistance and reduced resistance to compression resulting from low material hardness. A laminate of, for example, hardened glass and thin corundum ceramic is a combination that has advantages with regard to tolerable display drop height and scratch resistance of the displays. In comparison with conventional laminates without transparent ceramic, it was possible to increase the maximum possible drop height until fracture occurs by at least 80%.

The parts of transparent corundum ceramic can be manufactured with large lateral dimensions of up to 400 mm. The parts of transparent corundum ceramic can additionally have a certain aspect ratio. In the context of this invention, the aspect ratio is understood to mean the maximum ratio of length to width of the component. Rectangular parts having an aspect ratio of less than 5 can be realized. This results in a preferred aspect ratio of the part of transparent corundum ceramic in the range of 1 (square) to 5 (rectangular). However, the parts of transparent corundum ceramic can also have the form of round panes having a diameter of up to 400 mm.

The invention claimed is:

1. A part of transparent corundum ceramic, wherein the ceramic is singly or multiply doped with at least one dopant comprising magnesium oxide, yttrium oxide, and/or lanthanum oxide, wherein a total amount of doping agent is ≤2000 ppm, the part has a thickness of <800 μm, the part is a consolidated part having a porosity <0.01%, average grain sizes D50 of the corundum ceramic in the consolidated part are <500 nm, and the part is in the shape of a wafer.

2. The part according to claim 1, wherein the part has a haze of <10%.

3. The part according to claim 1, wherein the part has a thickness of <500 μm.

4. A laminate, comprising a layer of the part of transparent corundum ceramic according to the invention according to claim 1 and at least one further layer of a substrate material.

5. Use of the laminate according to claim 4 for displays of dive computers, mobile telephones, tablets, notepads, or watches, watch crystals, scratch-resistant sensors, ground lights, machine windows, or camera lenses.

6. A display of a dive computer, comprising the laminate according to claim 4.

7. A display of a mobile telephone, comprising the laminate according to claim 4.

8. A display of a tablet, comprising the laminate according to claim 4.

9. A display of a notepad, comprising the laminate according to claim 4.

10. A display of a watch, comprising the laminate according to claim 4.

11. A watch crystal, comprising the laminate according to claim 4.

12. A scratch-resistant sensor, comprising the laminate according to claim 4.

13. A ground light, comprising the laminate according to claim 4.

14. A camera lens, comprising the laminate according to claim 2.

15. The part according to claim 1, wherein the part has a haze of <6%.

16. The part according to claim 1, wherein the part has a haze of <3%.

17. The part according to claim 1, wherein the part has a thickness of <250 μm.

18. The part according to claim 1, wherein the average grain sizes D50 of the corundum ceramic in the consolidated part are <350 nm.

19. The part according to claim 1, wherein the at least one dopant consists of magnesium oxide, yttrium oxide, and/or lanthanum oxide.

* * * * *